June 11, 1957  L. N. ALBRECHT  2,795,265
SEAT CONSTRUCTION

Filed Nov. 6, 1952  4 Sheets-Sheet 1

Inventor
Leonard N. Albrecht
By
Willits, Helwig & Baillio
Attorneys

June 11, 1957 L. N. ALBRECHT 2,795,265
SEAT CONSTRUCTION
Filed Nov. 6, 1952 4 Sheets-Sheet 3

Inventor
Leonard N. Albrecht
By Willito Helwig & Baillio
Attorneys

June 11, 1957   L. N. ALBRECHT   2,795,265
SEAT CONSTRUCTION
Filed Nov. 6, 1952   4 Sheets-Sheet 4
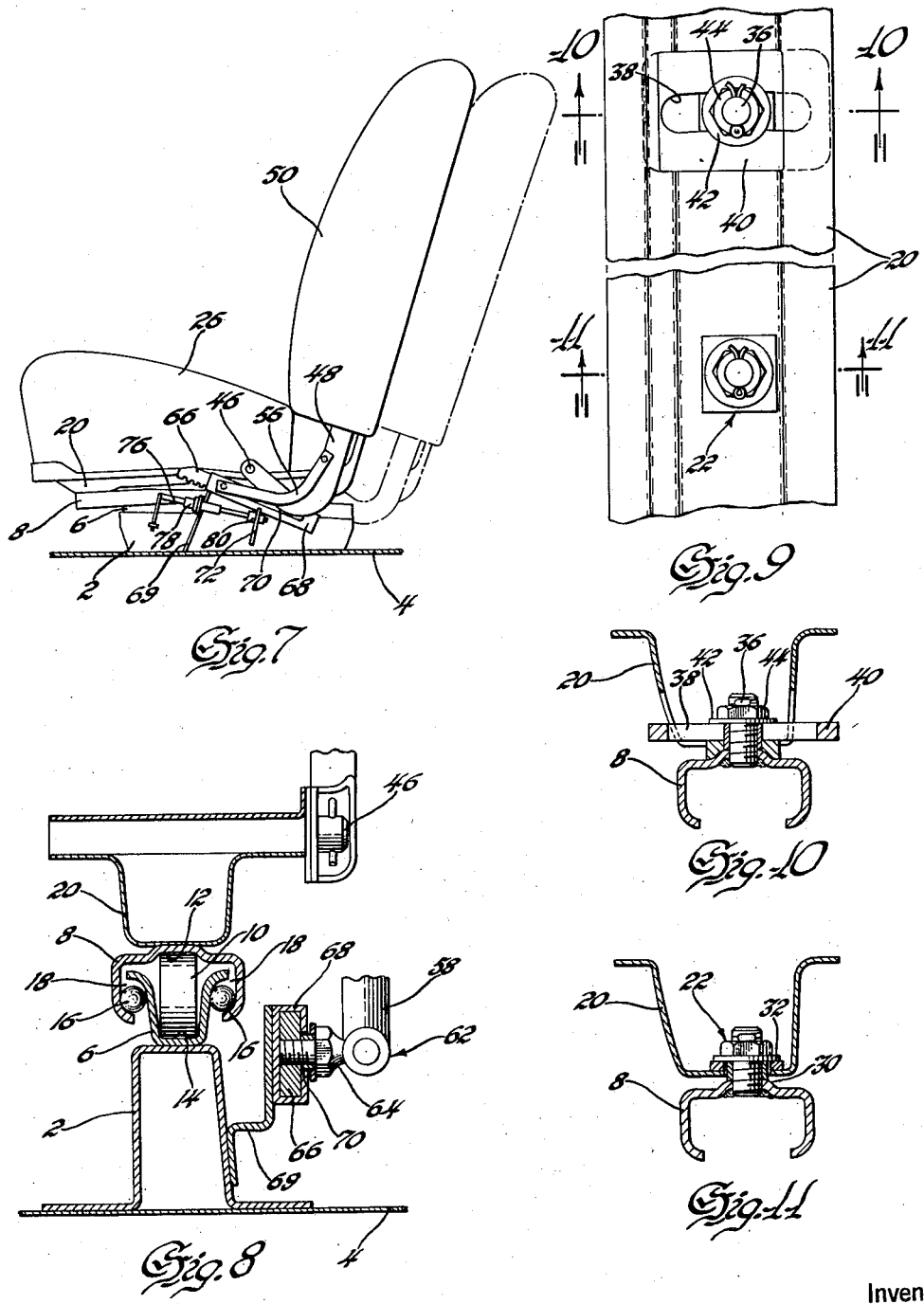
Inventor
Leonard N. Albrecht
By Willits, Helwig & Baillie
Attorneys

United States Patent Office 2,795,265
Patented June 11, 1957

2,795,265

SEAT CONSTRUCTION

Leonard N. Albrecht, Birmingham, Mich., assignor to General Motors Corporation, Detroit, Mich., a corporation of Delaware Application November 6, 1952, Serial No. 319,016

12 Claims. (Cl. 155—14)

This invention relates to adjustable seat structures and more particularly, although not exclusively, to adjustable front seat structures for two door vehicles having a front and rear seat.

Two door automotive vehicle bodies having full width front and rear seats have for many years accounted for a very large percentage of the industry's total volume of passenger vehicles. This body style is not only preferable from the manufacturing standpoint, due to greater structural rigidity and reduced cost as compared to four door vehicles, but has in addition become progressively more popular with vehicle owners for reasons of convenience and safety. Experience has shown that a steadily increasing proportion of vehicle owners prefer the two door body because of the elimination of annoyance from partially closed rear doors, the necessity of checking four door locks, and primarily the complete elimination of hazard of rear doors accidentally opened when small childern occupy the rear seat.

Weighed against the several advantages of the two door vehicle body, has been the considerable difficulty encountered by adult passengers entering and leaving the rear seat, due to the limited clearance between the rear of the front seat and the rear of the door opening. While the provision of a tilting split back on the front seat has partially overcome this disadvantage, it is apparent that this does not increase the entrance space at the cushion level, which is the most difficult for the passenger to negotiate when entering and leaving the rear seat. The present invention is directed to an improved tiltable split back type of front seat providing additional clearance for entrance to the rear seat.

One object of the present invention is to provide an improved adjustable front vehicle seat having mechanism permitting selective compound motion for increasing entrance space to the rear seat.

Another object is to provide an adjustable front seat mechanism of the type described which is selectively operable to permit easy entrance from either side of the vehicle.

Still another object is to provide a front seat mechanism which permits easy entrance to the rear seat of the vehicle from both sides simultaneously.

A further object is to provide a split back seat which is temporarily movable in response to the tilting motion of either or both seat backs and is adjustable to a plurality of fixed positions.

A still further object is to provide a split back front seat wherein tilting of either seat back separately will cause the seat cushion to swing in an arc generated from an axis on the side of the cushion opposite the seat back being tilted.

Yet another object is to provide a seat of the type described wherein simultaneous tilting movement of both seat backs will cause the seat cushion to travel fore and aft substantially parallel to the longitudinal axis of the vehicle.

Still another object is to provide a seat mechanism of the type described wherein tilting movement of the seat backs may be accomplished alternately, successively, or simultaneously.

Still a further object is to provide a seat of the type described wherein the seat is directly responsive to the tilting movement of either seat back in either direction.

A still further object is to provide a seat mechanism having releasable means for preventing yawing of the seat during fore and aft adjusting of the seat to fixed positions.

Other objects and advantages will become more fully apparent from the following description wherein reference is made to the accompanying drawings illustrating a preferred embodiment of the invention and wherein similar reference numerals designate similar parts throughout the several views. In the drawings:

Fig. 7 is a view similar to Fig. 5 showing the seat assembly in the full forward fixed position of adjustment.

Fig. 8 is a partial front sectional elevational view, taken substantially along the line 8—8 of Fig. 1.

Fig. 9 is an enlarged fragmentary view of the slotted connection between the seat frame and the adjustor channels taken substantially along line 10—10 of Fig. 4.

Fig. 10 is a front sectional, elevational view, taken substantially along line 10—10 of Fig. 9, and Fig. 11 is a front sectional elevational view taken substantially along line 11—11 of Fig. 9.

Figure 1:
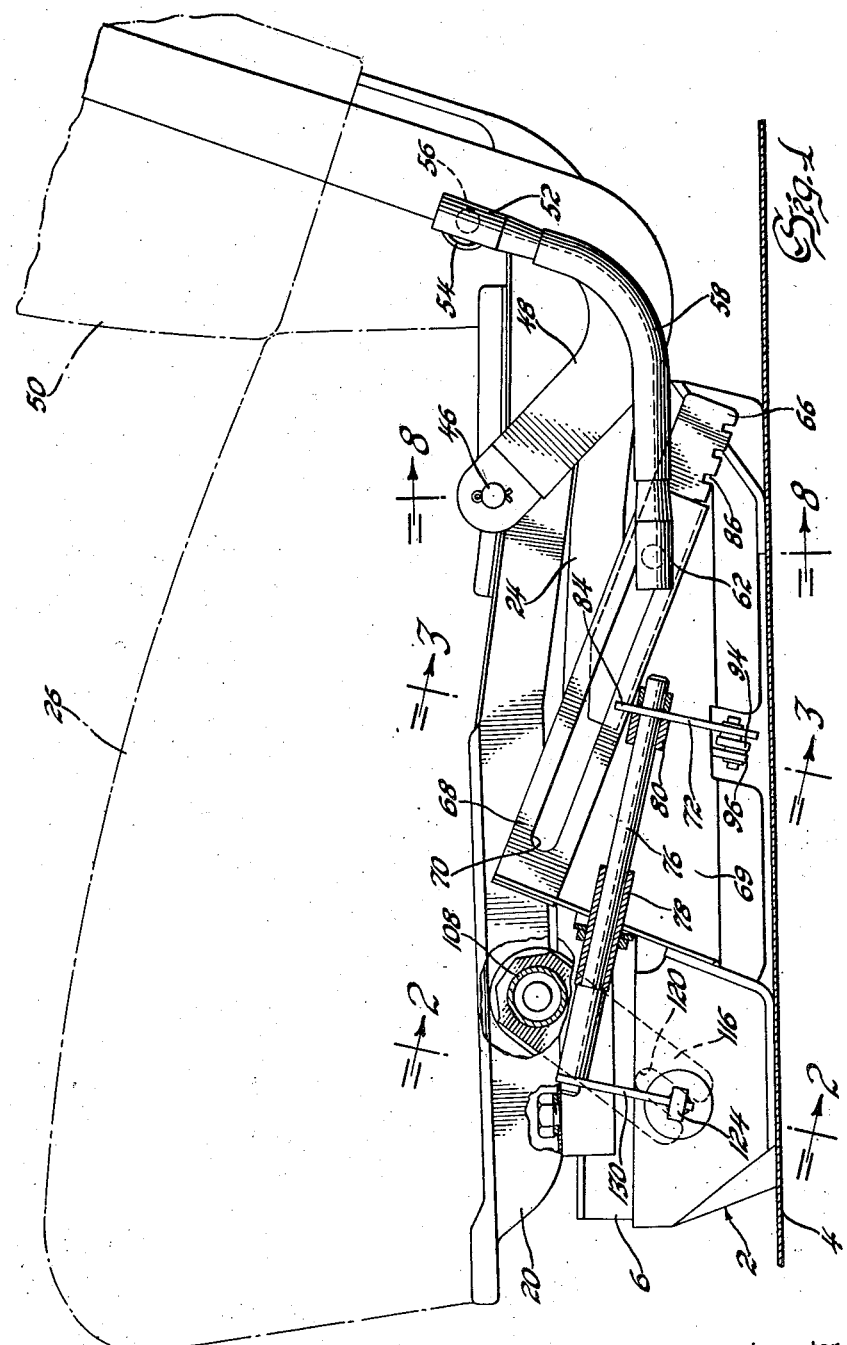
Fig. 1 is a side elevational view of the seat adjustor and tilting mechanism comprising the present invention, parts being broken away to more clearly show certain features thereof.
Figure 2:
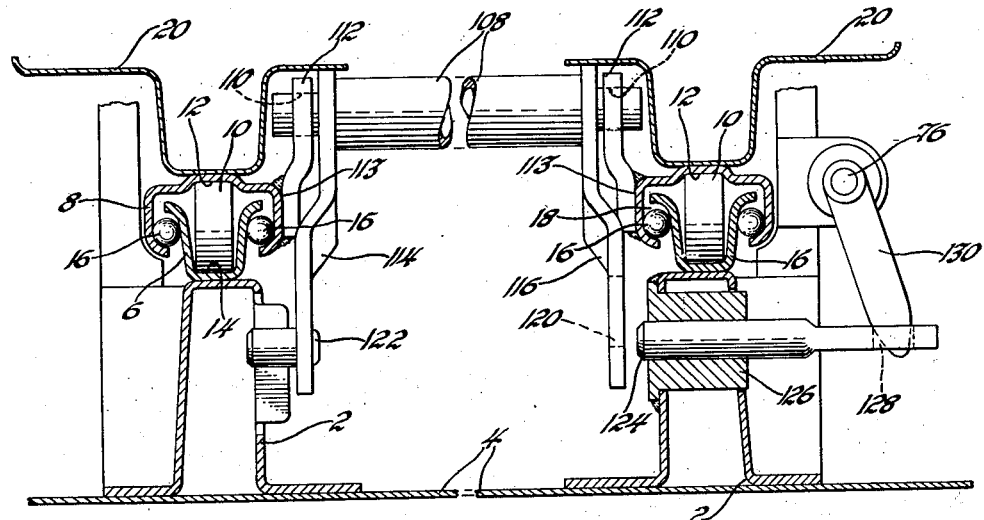
Fig. 2 is a front elevational view partly in section, showing the relative disposition of the seat frame, the fore and aft adjustor rails and the seat legs together with the releasable anti-yawing means, said view being taken substantially along line 2—2 of Fig. 1.

Referring now to the drawings and particularly Figs. 1 and 2 there is shown a seat adjusting mechanism wherein the numeral 2 designates seat supporting pedestals or bracket members secured to the floor 4 of the vehicle adjacent the right and left doors thereof, in parallel spaced relation to each other. Brackets 2 are identical with the exception of a minor detail to be described later herein, and provide rigid supports for a pair of spaced apart lower channel members 6 which are secured thereto by welding or other suitable means. Since the mechanism is identical for both sides of the seat, similar numerals are used for similar elements disposed at each side of the seat. Lower channel members 6 comprise elongated rails of upwardly flared U-shaped cross section and are slightly curved relative to the floor of the vehicle. Channel members 6 serve as guide rails for elongated inverted U-shaped upper channel members 8 which are mounted for slidable movement fore and aft thereon. To provide for smooth, silent fore and aft movement of upper channel members 8 along lower channel members 6, a plurality of rollers 10 are disposed between the inner longitudinal surfaces 12 and 14, respectively, of said upper and lower channel members. Upper channel members 8 partially enclose lower channel members 6 and a plurality of ball bearings 16 are disposed in the longitudinally extending spaces 18 formed by the overlapping relationship of said channel members. Balls 16 provide antifriction means for maintaining channels 8 in proper alignment with lower channel 6 and thereby assuring proper rolling contact thereof with rollers 10. It will be apparent that such an arrangement will permit smooth sliding longitudinal movement of upper channels 8 over lower channels 6 while eliminating any looseness and attendant rattling.

A pair of seat frame supports 20 constructed of channel section sheet metal extend longitudinally of channels 8 and are connected thereto by front pivotal connections 22 and rear pivotal connections 24 and serve as supports for a conventional bench type cushion 26 which is mounted thereon in a conventional manner. Seat frame supports 20 are connected to upper channel members 8 as shown particularly in Fig. 4. Connections 22 shown particularly in Fig. 11 comprise conventional pivotal connections comprising threaded upstanding studs 28 secured to upper channel members 8, as by welding, and adapted to extend upwardly through apertures 30 formed in seat frames 20. Washers 32 and nuts 34 are subsequently assembled on studs 28 to secure upper channel members 8 and seat frame supports 20 against axial shifting, but which permit pivotal movement of said frame supports. Rear pivotal connections 24 comprise threaded upstanding studs 36 secured to upper channel members 8 and adapted to extend through laterally extending curved slots 38 provided in plates 40 mounted in seat frame supports 20 to permit lateral movement of seat frames 20 relative to upper channel members 8 about pivotal supports 22. Washers 42 and nut 44 are subsequently assembled on studs 36 to secure upper channel members 8 and seat frame supports 20 against axial shifting but to permit relative pivotal and slidable movement therebetween. It will be apparent that swinging movement of the cushion about either pivot 22 will produce a certain degree of lateral movement of the rear edge of the seat.

Figure 4:
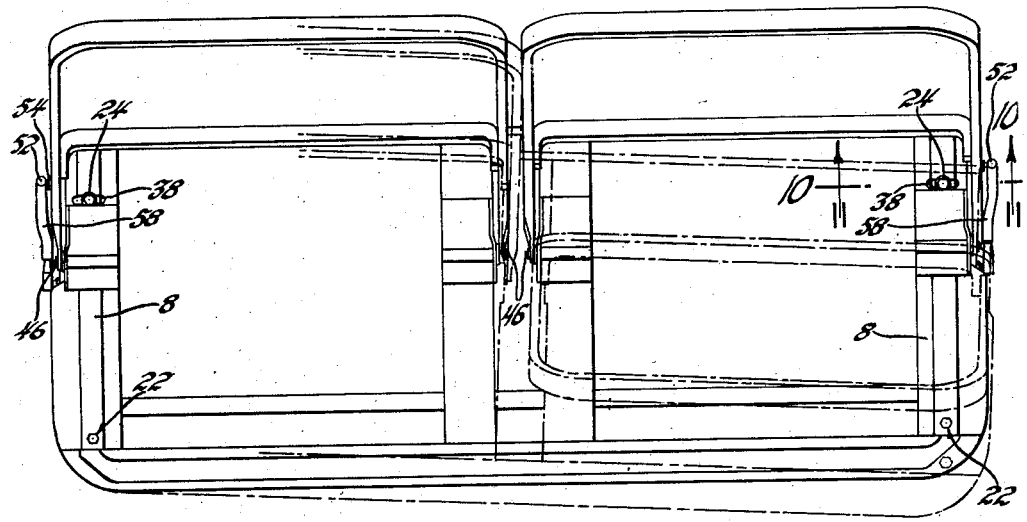
Fig. 4 is a plan view of the seat adjusting mechanism, showing the position of the seat proper with both seat backs in the normal position and also with one of the seat backs tilted forward.
Figures 5, 6:
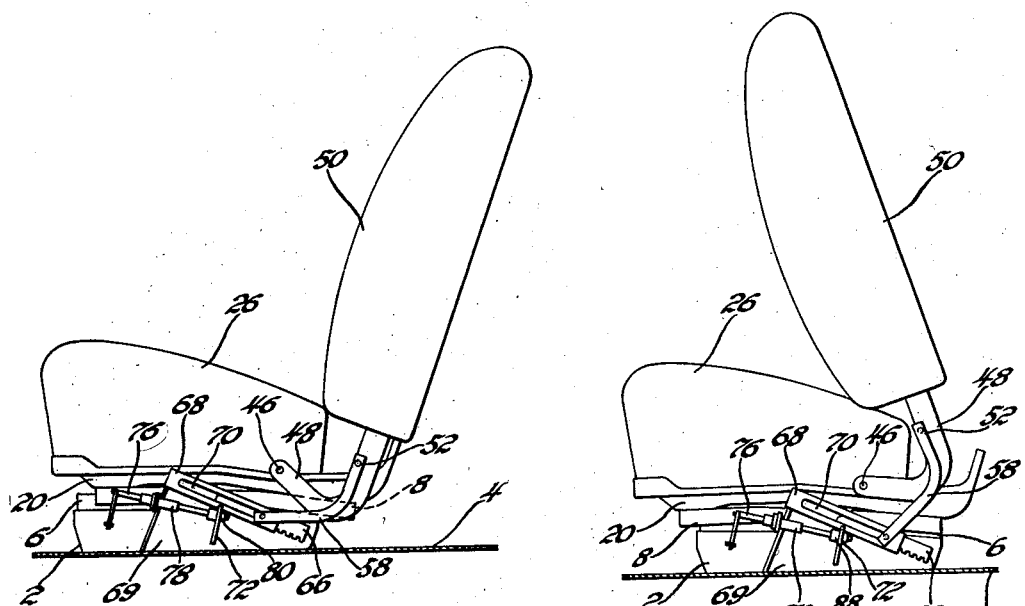
Fig. 5 is a side elevational view of the seat assembly in the rearwardmost fixed position of adjustment, with the seat backs in the normal position.
Fig. 6 is a view similar to Fig. 5 showing the relative position of the various elements when seat back is tilted forward.

Attached adjacent to the rear edge of seat support members 20 and extending laterally outwardly therefrom are trunnions 46 which provide the axis of rotation for gooseneck hinge members 48 for seat backs 50. As shown in Fig. 4, both seat backs are provided with inner hinge pivots 46 which are disposed in axial alignment with hinge pivots 46 at the outer edges of the seat, whereby both seat backs 50 may be swung forwardly in parallel relation to the lateral center line of the cushion 26. Rearwardly of trunnions 46, lower hinge arms 48 have attached thereto the ball portion 54 of a conventional ball and socket connection 52. Ball portions 54 are adapted for engagement in socket portions 56 carried by tubular L-shaped arms 58 which extend downwardly and forwardly for connection with seat adjusting plates 66 by ball and socket connections 62. Ball members 64 are secured by threaded means to adjusting plates 66 which in turn are mounted for slidable movement in the substantially rectangular interior of adjusting plate guides 68, as shown more particularly in Fig. 8. Guide members 68 are elongated rectangular members of hollow cross section having outwardly facing longitudinally extending slots 70 to provide clearance for ball members 64 as the adjusting plates 66 move fore and aft. Rectangular guide members 68 are rigidly secured to brackets 2 in outwardly offset substantially parallel relation longitudinally thereof but are forwardly and upwardly inclined with respect to floor 4 of the vehicle, as shown in Fig. 1.

Figure 3:
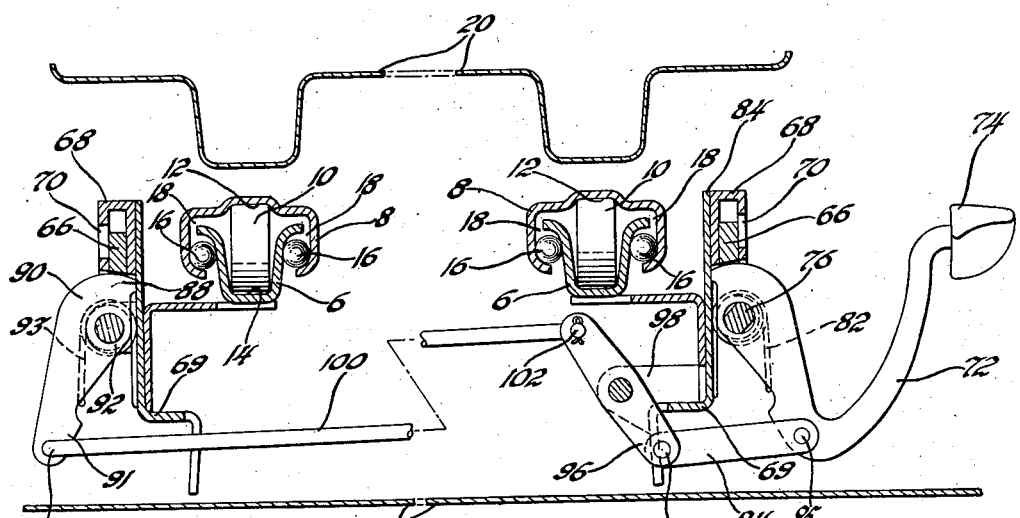
Fig. 3 is a front elevational view partly in section, showing the details of construction of the adjustor rails and the associated fore and aft adjustor and coincidental manual latch, said view being taken substantially along line 3—3 of Fig. 1.

A manually operable coincidental latch mechanism is provided to selectively secure seat adjusting plates 66 in guide members 68 or to release said plates for slidable movement within said guide members when it is desired to move the seat to any fixed predetermined position of adjustment. A U-shaped manual lever member 72, having a thumb grip 74 at its outer end, has rigidly secured thereto one end of a shaft 76 which is journaled in bushings 78 and 80 secured in any suitable manner to bracket 69. Shaft 76 and bushings 78 and 80 incline upwardly and forwardly as shown in Fig. 1. Latch member 72 is spring biased upwardly and inwardly by spring members 82, carried by shaft 76, causing the upper blade end 84 thereof to enter one of the slots 86 spaced along the lower edge of adjustor plate 66. A second latch member 90 is mounted on a bushing 92 secured to a bracket 69 disposed at the opposite side of the seat and has a blade 88 thereon adapted to similarly enter any one of the slots 86 disposed along the lower edge of a second adjustor member 66. A spring 93 normally urges latch member 90 into latching engagement with adjuster member 66 as shown in Fig. 3. To provide for coincidental release and engagement of the blade end 88 of latch member 90 with blade 84, suitable interconnecting mechanism is provided. As shown in Fig. 3 one end of a link 94 is pivotally connected to latch member 72 near its lower extremity as shown at 95, the other end being connected to the lower end of a lever 96 as shown at 97. Lever 96 is pivoted intermediate its ends on a bracket 98 secured to the inner wall of left seat bracket 2. A transversely extending rod 100, having short right-angle end portions 102 and 104 are connected respectively to the upper end of reversing lever 96 and to the lower end 91 of latch member 90 and is held in position thereon by cotter keys. It will be apparent that downward manual depression of the thumb grip 74 of latch member 72 will cause outwardly swinging movement of latch member 72 and 90 whereby blades 84 and 88 thereof will be simultaneously withdrawn from notches 86 formed in their respective adjusting plates 66, to permit fore and aft movement of the seat proper to its various positions of adjustment.

In order to provide smooth fore and aft sliding movement of the seat proper, when it is desired to change the permanent position of adjustment, a tubular equalizer bar 108 is provided. Equalizer bar 108 extends transversely across the seat frame and is journaled in aligned apertures 110 formed in brackets 112 secured to the inner side walls 113 of upper channel members 8 by welding or other suitable means. Integral with equalizer bar 108 and extending downwardly and forwardly therefrom at each end thereof are equalizer legs 114 and 116 having elongated open end slots 120 formed at the lower ends thereof. As shown in Fig. 2 right seat bracket 2 has rigidly secured thereto an inwardly extending stud 122 which extends into the slot 120 in leg 114. Left seat bracket 2 is provided with an axially shiftable transverse stud 124 mounted for movement in a guide member 126 and adapted for movement into and out of the slot 120 in leg 116. Near its outer end, stud 124 is provided with a longitudinal slot 128 which receives the lower end of an operating arm 130. Arm 130 is secured to shaft 76 and is movable in response to actuation thereof by latch 72. It will be apparent that when latch member 72 is depressed to release seat adjustor plates 66 for fore and aft movement of the seat proper, the arm 130 will swing inwardly causing the shiftable stud 124 to shift axially inwardly into slot 120 in leg 116. It will be seen that both sides of the seat may now be moved forwardly at a uniform rate, since any yawing motion or unequal rate of travel of the upper channel members 8 will induce a twisting action between equalizer legs 114 and 116, which is resisted by tubular equalizer bar 108. After the seat proper is adjusted to the desired position, the manual latch member 72 is released and springs 82 and 93 then rotate blades 84 and 88 into engagement with adjusting members 66 and at the same time withdrawing shiftable stud 124 from the slot 120 in equalizer leg 116. Since the equalizer leg 114 and stud 122 remain engaged at all times, the slotted end 120 of leg 116 will remain in alignment with shiftable stud 124 when the seat is in the normal position, but will permit swinging movement of the cushion above pivots 22 which is resisted when both legs of the equalizer bar are engaged.

The operation of the seat mechanism when it is desired to obtain greater clearance for entrance to the rear seat will now be described. It will be seen that when the seat adjustor plates 66 are locked in any fixed position of adjustment by manual latch 72, seat backs 50 are pivotally connected both to the cushion frame at pivot shafts 46 by hinge members 48 and to the ball members 64 on seat adjusting plates 66, by tubular members 58. Ball portions 54, which are integral with hinge arm members 48 must therefore travel in an arcuate path consistent with these two dissimilar pivotal connections. It will be seen that the axis of rotation about the pivots 46 is in substantially the same horizontal plane, while the axis of rotation about the ball joints 64 are in substantially downwardly offset relation thereto. With this relative arrangement of pivotal connections, forward tilting motion of the seat backs 50 will cause ball joints 54 to describe arcuate paths having a greater forward component than the arcuate paths described about pivots 46. It will therefore be apparent that pivots 46 must move progressively forward as the seat backs 50 are tilted forward. Since pivots 46 are rigidly attached to the seat frames 20, it follows that said seat frames and the upper channel members 8 will be urged forwardly along lower channel members 6, to maintain constant, the distance between the pivots 46 and ball joints 54. Upon reversal of the movement of the seat backs 50, seat frames 20 and upper channel members 8 will slide longitudinally rearwardly since pivots 46 must move progressively rearwardly as ball joints 54 move rearwardly in the path dictated by ball joints 64.

Since the clearance between the seat back 50 and the rear of the door opening is least when the seat is in its rearwardmost fixed position of adjustment, it will be apparent that as the seat proper is moved to its forward position of adjustment there will be progressively decreasing necessity for temporary increased clearance for entrance to the back seat. The present invention is therefore adapted to provide the maximum amount of temporary forward movement of the seat cushion when the seat is in the rearwardmost fixed position of adjustment and to provide progressively decreasing temporary forward movement of the seat as it approaches the forwardmost fixed position of adjustment. To accomplish this end, rectangular guide members 68 for seat adjustor plates 66 are inclined forwardly and upwardly. It will be apparent that as the plates 66 move forwardly in the inclined guide members 68, ball joints 64 progressively rise and move forwardly. As ball joints 64, pivots 46, and ball joints 54 approach linear alignment, progressively less forward movement of the pivots 46 are required as the ball joints 54 travel in a path described by the forward tilting of the seat backs 50, due to the more nearly parallel arcs described about pivots 46 and ball joints 64. Therefore, although full forward tilting of the seat backs are permitted, the corresponding degree of forward movement of the cushion is progressively reduced. In practice it has been found that the preferred degree of inclination of the rectangular guide members 68 should provide approximately 4½ inches of forward motion of the cushion when the seat is in the rearwardmost fixed position of adjustment and progressively diminishing to approximately 1½ inches of forward motion of the cushion when the seat proper is in the forwardmost fixed position of adjustment. Since the seat proper is designed for approximately 5 inches of fore and aft fixed adjustment it will be apparent that the net additional entrance space to the rear seat is attained regardless of the fixed position of adjustment of the seat.

In order to more fully understand the scope of operation of the present invention a description of the various modes of operation will be given. It will be apparent that when one seat back only is tilted forward, as for instance the left seat back, the right side of the cushion 26 will be retained in the fixed position of adjustment due to the relative relationship of pivot 46, ball joint 54, and ball joint 64 connected to the right seat back and adjuster rail. Therefore, as the left seat back 50 is tilted forwardly the cushion 26 swings in a horizontal arc about the right front pivot connection 22. As the cushion pivots about the right front pivot 22 both rear pivotal connections 24 of the seat travel in arcs described by the right pivot 22. Thus, the right rear edge of the cushion moves laterally in a path defined by slotted plate 40 on seat frame 20 while the left rear edge of the cushion travels laterally in a path defined by the left slotted plate 40 as well as forwardly along lower channel member 6. Since the slots 38 in plates 40 provide for lateral movement of the cushion outwardly in either direction it will be seen that when the left seat back 50 is tilted forwardly the pivotal connections at 24 will occupy the innermost limit of slot 38 on the left side and approximately the outermost limit of slot 38 on the right side. However, if it is desired to tilt the right seat back forward after the left seat back has been tilted to the forward position, no obstruction is encountered since subsequent forward tilting movement of the right seat back induces horizontal swinging movement of the cushion about the left pivot 22 causing the right side of the cushion to swing forwardly in an arc until the right side of the cushion has traveled forward an equal distance, at which point the cushion 26 will again be substantially parallel with the lateral axis of the vehicle. It will of course be apparent that either seat back may be returned to the normal upright position separately, or both seat backs may be returned simultaneously. It will be equally apparent that both seat backs may be tilted forwardly simultaneously, in which event the cushion 26 will travel forwardly at a constant rate at both sides.

From the foregoing description it will be seen that a highly novel seat mechanism has been provided which will permit greatly increased entrance space to the rear seat of a vehicle from either side or from both sides simultaneously. In addition, the mechanism is not susceptible to damage from inadvertent operation, since either side may be operated independently, both sides may be operated in concert, or any variation thereof such as tilting one seat back rearwardly while tilting the other seat back forwardly. In addition to the inherent advantage of responding to any conceivable variation in mode of operation, the device employs, for the most part, conventional seat structure commonly used in production passenger vehicles. Such additional parts as are required are for the most part simple in construction and susceptible to rapid fabrication.

While the embodiment of the present invention herein disclosed constitutes a preferred form, it is to be understood that other forms and modifications might be made therein without departing from the invention. It is to be understood, therefore, that it is not intended to limit the invention to the single embodiment disclosed but only by the scope of the claims which follow.

I claim:

1. In a seat structure for a vehicle body, the combination of a seat having a pair of tiltable seat backs pivotally mounted thereon, a pair of substantially parallel longitudinal guide mechanisms for said seat, each of said guide mechanisms comprising a fixed guide element and a cooperating slidable element, said seat being slidably adjustable to a plurality of fixed positions fore and aft of said fixed guide elements, connecting means for said seat and each of said slidable elements permitting independent longitudinal movement of either of said slidable elements in response to tilting movement of the adjacent seat back and simultaneous longitudinal movement of said slidable elements in response to tilting movement of both said seat backs, and interengaging means on said seat backs and said fixed guide elements adapted to provide progressively decreasing longitudinal movement of said slidable elements as said seat is progressively moved toward its forward position of adjustment.

2. In a seat structure for a vehicle body, the combination of a pair of spaced apart pedestal members, guide means supported on each of said pedestal members, a seat having a pair of tiltable seat backs pivotally mounted thereon in side by side relation, means for connecting said seat and said guide means including pivotal means permitting lateral swinging movement of said seat relative to said guide means, and interengaging means on said seat backs and said pedestal members whereby tilting movement of either seat back imparts horizontal swinging movement to the said seat about a stationary axis at the side opposite the back tilted.

3. A seat having tiltable back portions pivoted thereon, guide mechanisms for said seat, said seat being longitudinally adjustable to a plurality of fixed positions fore and aft on said mechanisms, means associated with said back portions and said mechanisms adapted to swing said seat horizontally from a fixed position in response to tilting movement of either seat back, said means being adapted to provide progressive reduction of said horizontal movement when said seat is progressively adjusted forwardly on said mechanisms.

4. A seat, a tiltable back portion for said seat, a guide mechanism supporting said seat, seat adjustor means on said guide mechanism, a hinge arm on said back portion, pivot means securing said arm to said seat, a link having a pivotal connection at one end secured to said hinge arm and a pivotal connection at the other end rigidly secured to said seat adjustor means, whereby said pivotal means on said hinge arm moves progressively forward in response to tilting movement of said back portions.

5. A seat, a tiltable back portion for said seat, a guide mechanism for said seat, movable adjustor means on said mechanism for securing said seat in a plurality of fixed positions longitudinally of said mechanism, means for imparting fore and aft movement to said seat comprising a hinge arm for said back portion, pivot means securing said hinge arm to said seat, a link having one end pivotally connected to said arm rearwardly of said pivot means and the other end pivotally connected to said adjustor means, whereby said hinge arm and said link describe different and progressively converging arcs as said adjustor is moved from its rearwardmost position toward its forwardmost position of adjustment.

6. In a seat structure for a vehicle body, the combination of a pair of spaced apart pedestal members, guide means supported on each of said pedestal members, each of said guide means comprising a fixed rail and a cooperating slidable rail, a seat, a supporting frame for said seat, a pair of tiltable seat backs pivotally mounted on said frame, means connecting said frame to said slidable rails for movement therewith, said connecting means including means permitting limited swingable movement of said seat in either direction relative to said slidable rails, and means operatively connecting each of said pivotal seat backs to each of said pedestal members whereby tilting movement of either of said seat backs imparts horizontal swinging movement to said seat, and tilting motion of both seat backs imparts linear motion to said seat in a direction substantially parallel with the longitudinal axis of said guide means.

7. In a seat structure for a vehicle body, the combination of a pair of spaced apart pedestal members, guide means supported on each of said pedestal members, each of said guide means comprising a fixed rail and a cooperating sliding rail, a seat, a supporting frame for said seat, a pair of tiltable seat backs pivotally mounted on said frame, said seat backs being forwardly tiltable from a normal upright position, means connecting said frame and each of said slidable rails for movement with the latter, said connecting means including means adapted to permit limited swingable movement of said seat in either direction relative to said slidable rails, means associated with each of said pivotal seat backs and each of said pedestal members whereby tilting movement of either seat back swingably moves said seat, and concurrent tilting movement of both seat backs imparts linear motion to said seat in a direction substantially parallel to the longitudinal axis of said vehicle body, means on said pedestal members to permit slidable adjustment of said seat to a plurality of positions along said fixed rail, and means associated with said slidable rails and said fixed rails to prevent unequal travel of said slidable rails during said fore and aft adjustment of said seat.

8. In a seat structure for a vehicle body, the combination of a pair of spaced apart parallel pedestal members, guide means secured on each of said pedestal members, each of said guide means including a fixed rail and a cooperating longitudinally slidable rail, a seat, a supporting frame for said seat, a pair of normally upright tiltable seat backs pivotally mounted on said frame, means connecting said frame and each of said slidable rails for coincidental longitudinal movement, said connecting means being adapted to permit limited swingable movement of said seat in either direction relative to said slidable rails, means associated with each of said pivotal seat backs and each of said pedestal members whereby tilting movement of either of said backs imparts swinging movement to said seat and tilting movement of both seat backs imparts linear movement to said seat in a direction substantially parallel with the longitudinal axis of said vehicle body, disengageable means associated with said slidable rails and said fixed rails to prevent unequal rate of travel of said slidable rails during fore and aft adjustment of said seat, and latch means for releasing said seat for adjustment along said fixed rails and for actuating said disengageable means to effective and ineffective position.

9. In a seat structure for a vehicle body, the combination of a pair of spaced apart pedestal members, guide means supported on each of said pedestal members, each of said guide means comprising a fixed rail and a cooperating slidable rail, a seat, a supporting frame for said seat, a pair of normally upright tiltable seat backs pivotally mounted on said frame, means connecting said frame and each slidable rail whereby said seat and said rails are coincidentally longitudinally movable, said connecting means being adapted to permit limited swingable movement of said seat in either direction relative to said slidable rails, means associated with each of said pivotal seat backs and each of said pedestal members whereby tilting movement of either heat back imparts swinging movement to said seat and tilting movement of both seat backs imparts linear motion to said seat in a direction substantially parallel with the longitudinal axis of the vehicle body, and means on said pedestal members adapted to permit slidable adjustment of said seat to a plurality of fixed positions of adjustment along said fixed rails when said seat backs are in the normal position, said last mentioned means being so constructed and arranged as to cause progressively diminishing swinging and linear movement of said seat in response to said tilting movement of said seat backs as said seat is progressively adjusted toward its forwardmost fixed position of adjustment.

10. A seat structure for a vehicle body, comprising a seat having pivotally mounted tiltable back portions adapted to swing forwardly from a substantially upright position, a pair of substantially parallel spaced apart guide mechanisms for said seat mounted beneath the ends thereof, each guide mechanism including a slidable rail and a fixed rail, a pair of upstanding studs secured on each of said slidable rails at opposite ends thereof, a supporting frame for said seat having apertures formed therein cooperating with said upstanding studs, one of said apertures on each side of said support being laterally elongated to permit limited swingable movement of said seat relative to said slidable rails, a slotted rectangular sleeve member secured to each of said guide mechanisms, a seat adjusting member slidably disposed in each of said sleeve members, latch means for retaining and releasing said members in a plurality of slidably adjustable positions, link means interconnecting said adjusting members and said back portions whereby slidable adjustment of said members determines the longitudinal position of said seat relative to said fixed rails when said seat backs are in their normal upright position, said link means engaging said seat backs at points rearwardly of said seat back pivots whereby said seat may be temporarily moved forward from its fixed position of adjustment by tilting movement of one or both of said seat backs, and means operable upon release of said latch means for equalizing the movement of said slidable rails.

11. A seat, a tiltable back portion pivotally mounted on said seat, a guide mechanism supporting said seat, movable adjuster means on said mechanism for securing said seat in a plurality of fixed positions longitudinally of said mechanism, and means for imparting fore and aft movement to said seat, said last mentioned means being so constructed and arranged as to provide progressively decreasing longitudinal movement of said seat as said seat is progressively moved toward its forward fixed positions of adjustment.

12. A seat, tiltable back portions pivoted on said seat in side by side relation, a pair of spaced apart supports for said seat permitting both linear and arcuate horizontal movement of the latter, means connecting said back portions and said supports whereby tilting movement of either seat back imparts horizontal swinging movement to said seat about an axis disposed on the opposite support and simultaneous tilting movement of said seat backs imparts horizontal substantially linear movement to said seat.

References Cited in the file of this patent

UNITED STATES PATENTS

| | | |
|---|---|---|
| 2,160,015 | Haberstump | May 30, 1939 |
| 2,170,923 | Jacobs | Aug. 29, 1939 |
| 2,189,396 | Greig | Feb. 6, 1940 |
| 2,246,076 | Riley | June 17, 1941 |
| 2,563,220 | Doty | Aug. 7, 1951 |
| 2,591,426 | Hadley | Apr. 1, 1952 |
| 2,634,429 | Hopeman et al. | Apr. 14, 1953 |
| 2,660,223 | Appleton | Nov. 24, 1953 |
| 2,681,688 | Haltenberger | June 22, 1954 |

FOREIGN PATENTS

| | | |
|---|---|---|
| 690,528 | France | June 23, 1930 |